Patented Oct. 9, 1945

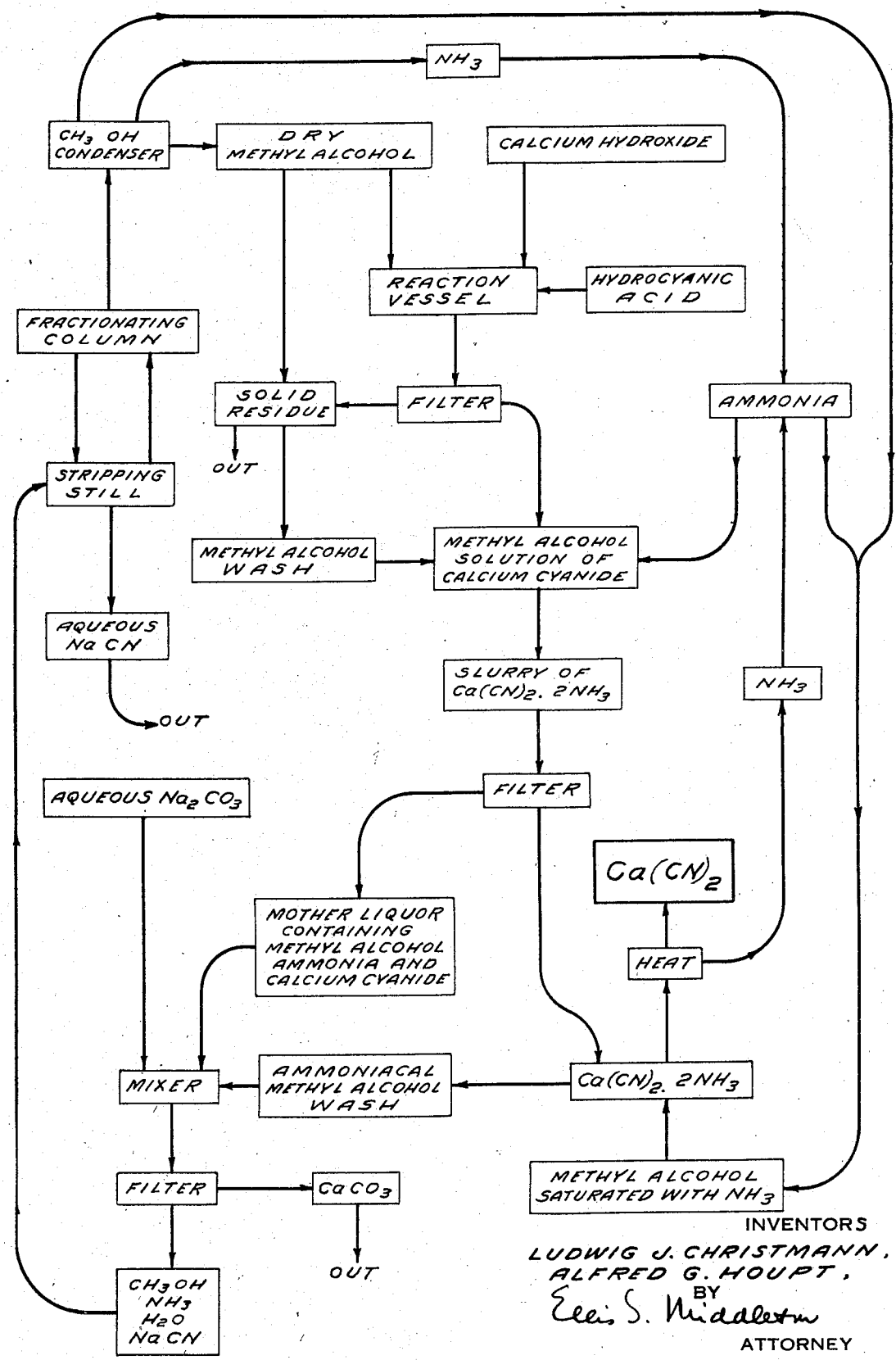

2,386,435

UNITED STATES PATENT OFFICE 2,386,435

METHOD OF PRODUCING ALKALINE EARTH METAL CYANIDES

Ludwig J. Christmann, Yonkers, N. Y., and Alfred G. Houpt, Stamford, Conn., assignors to American Cyanamid Company, New York, N. Y., a corporation of Maine Application April 24, 1943, Serial No. 484,378

4 Claims. (Cl. 23—79)

The present invention relates to the production of alkaline earth metal cyanides, and more particularly to a method of preparing the cyanide compounds in a substantially pure form.

The alkaline earth metal cyanides are adapted for a variety of uses, for example, calcium cyanide is a readily available source of hydrocyanic acid through decomposition when exposed to a moist atmosphere. Consequently, the compound is applicable to such uses as fumigation for the control and extermination of insects. Calcium cyanide is also utilized in the mining industry, for example, in processes for the extraction of metals from their ores. Barium and strontium cyanides are of particular utility as cementation agents in fused salt baths for case-hardening iron and steel articles.

The principal object of this invention is to provide a method whereby the alkaline earth metal cyanides may be readily and cheaply obtained. A further object resides in a method for the production of the alkaline earth metal cyanides requiring only simple equipment with high efficiencies. Other objects will appear hereinafter.

The prior art teaches that calcium cyanide may be formed by reacting calcium oxide or calcium hydroxide with hydrocyanic acid in methyl or ethyl alcohol as a suspending medium. The thus produced calcium cyanide immediately goes into solution in the alcohol and may be recovered therefrom by adding an excess amount of hydrocyanic acid.

It is known to these applicants that other alkaline earth metal cyanides may be similarly formed by treating the corresponding oxides or hydroxides.

It is also known in the prior art that if calcium hydroxide or calcium oxide is suspended in methyl or ethyl alcohol and there is added thereto hydrocyanic acid gas to which ammonia is admixed, that calcium cyanide diammoniate will precipitate.

In any commercial method involving the separation of an alkaline earth metal cyanide diammoniate from mother liquors containing methyl or ethyl alcohol, the alcohol must be recovered or recycled or else the expense involved is such as to be objectionably high. These applicants have discovered that one cannot take these alcoholic mother liquors and recycle them without treatment.

The present invention, therefore, is based upon the fact that these alcoholic mother liquors containing ammonia and residual cyanide must be treated in such a manner that the alcohol recovered therefrom is substantially free of ammonia before being used to dissolve newly formed alkaline earth metal cyanides, for the reason that the initial discovery has been made that such cyanides are less soluble in alcohol containing ammonia than in ammonia-free alcohol.

A very important object of the invention, therefore, is to provide a cycle of operations from which alkaline earth metal cyanide diammoniates may be recovered for subsequent treatment to the cyanides, where the mother liquors therefrom containing alcohol, ammonia and residual cyanide are thus treated to recover the ammonia-free alcohol for recycle into the process.

It has been found that the above objects may be attained by establishing a cycle of operation which includes the steps of forming an alcohol solution of an alkaline earth metal cyanide by treating a mixture of a compound chosen from the group consisting of alkaline earth metal oxides and hydroxides and an alcohol chosen from the group consisting of methyl and ethyl alcohol with hydrocyanic acid, treating the alcohol solution with ammonia, separating the precipitated alkaline earth metal cyanide diammoniate from the mother liquor, deammoniating the same to produce the desired alkaline earth metal cyanide and recovering alcohol and/or ammonia for return to the cycle.

A convenient method of carrying out the above cycle of operation is shown in diagrammatic form in the accompanying flow sheet. When the method is used to produce the cyanide of calcium, for example, a methyl alcohol solution of calcium cyanide is formed by passing gaseous hydrocyanic acid into a continuously agitated slurry of calcium hydroxide in dry methyl alcohol cooled to a temperature preferably below 40° C. When a commercial grade of calcium hydroxide is used, which may contain impurities such as silica, alumina, silicates, etc., or should some unreacted calcium hydroxide remain in the menstruum, the insoluble materials may be removed by filtration, the filter cake washed with methyl alcohol and the washings added to the filtrate. The alcohol solution of calcium cyanide is a light straw-colored liquid which is reasonably stable upon standing, particularly if maintained at low temperatures.

In the preferred form, dry ammonia gas is then introduced into the calcium cyanide solution, whereupon calcium cyanide diammoniate is precipitated as a crystalline, grayish-white, readily filterable solid, having a slight pinkish cast. Due to the comparatively high heat of solution of ammonia in methyl alcohol, cooling of the mixture during the ammoniation is desirable, preferably to a temperature below 35° C., to avoid undue azulmic decomposition and darkening of the liquor.

Where anhydrous liquid ammonia is available, this material may be used advantageously for the simple reason that its addition at this point tends to maintain a desirably low temperature in the precipitating vessel.

While the use of ammonium hydroxide has a drawback in that it introduces water, yet in the case of concentrated ammonium hydroxide, only small quantities of water would enter the reacting menstruum, which may not cause a sufficient lowering of final yields to be entirely objectionable.

The slurry of calcium cyanide diammoniate is then filtered and the diammoniate may be washed with methyl alcohol saturated with ammonia. When so washed, the combined filtrate and washings containing methyl alcohol, ammonia and residual calcium cyanide are treated with a compound which, through double decomposition with the residual calcium cyanide, forms an insoluble calcium compound and a soluble cyanide. Compounds which may be used for this purpose are carbonates, and in particular, the alkali metal carbonates, e. g. sodium carbonate, which are added to the mother liquor preferably in aqueous solution. The mixture is then filtered to remove the precipitated calcium carbonate. The filtrate is charged into a stripping still equipped with a fractionating column and a condenser. The alcohol and ammonia pass from the fractionating column into the condenser where they are separated and separately returned to the cycle. The aqueous cyanide residue is removed from the still and may be used for specific purposes known in the art.

In the above step, the mother liquor from the diammoniate precipitation is thus treated for the purpose of having present a more stable cyanide, namely, sodium cyanide, from which the alcohol can be distilled. If the mother liquor is heated to a temperature sufficient to distill off the alcohol, a reaction takes place between the residual calcium cyanide and the alcohol forming impurities which carry over in the distillate.

The calcium cyanide diammoniate is then deammoniated by heating to produce the substantially pure calcium cyanide, and the evolved ammonia returned to the cycle. A temperature of from 200 to 230° C. is required for rapid separation of the ammonia. Temperatures within the range of 180 to 325° C. are feasible. However, care must be taken at the higher temperatures to avoid decomposition of the calcium cyanide. The deammoniation may be carried out by heating the diammoniate under a partial vacuum to avoid the contact of air and particularly moisture, and to facilitate the removal of the evolved ammonia.

As above stated, a highly important step in the above cycle is the treatment of the mother liquor from the diammoniate precipitation involving the recovery of the alcohol and ammonia reagents. It is important and again emphasized that the recovered alcohol be substantially ammonia-free when returned to the cycle as it has been found that an ammonia content greater than about one percent greatly impedes the dissolution of the calcium cyanide therein. Recycling the mother liquor as such would therefore lessen the efficiency of the process. Furthermore, removal of the ammonia by merely heating the mother liquor is unsatisfactory as azulmic-decomposition takes place with the formation of impurities soluble therein which lessen the grade of the final product if this liquor is used in a subsequent extraction cycle. As a consequence, by recovering the cyanide, alcohol and ammonia separately from the mother liquor, interference of one with the other or with the efficient operation of the entire cycle is avoided, while at the same time all values can thus be used in this or other processes.

*Example*

100 grams (1.34 moles) of reagent grade, powdered calcium hydroxide were suspended in 1,000 cc. of dry methyl alcohol. 2.24 moles of gaseous hydrocyanic acid were passed slowly into the agitated slurry maintained at a temperature between 15 and 20° C. Agitation of the slurry was continued for 15 minutes after the addition of the hydrocyanic acid. The resulting liquor containing excess calcium hydroxide in suspension was filtered and the filter cake washed with 50 cc. of dry methyl alcohol. The combined filtrate and washings were treated with 5 moles of gaseous ammonia at a temperature of about 20° C. with continuous agitation. The resulting suspension of calcium cyanide diammoniate crystals was filtered, and the filter cake washed with cold dry methyl alcohol saturated with ammonia. The combined filtrate and wash liquor containing methyl alcohol, ammonia and residual calcium cyanide was treated with a 5% aqueous sodium carbonate solution to convert the calcium cyanide to sodium cyanide. The precipitated calcium carbonate was filtered off and the filtrate charged into a stripping still equipped with a fractionating column and a condenser. The methyl alcohol and ammonia were distilled from the mixture leaving the aqueous sodium cyanide residue in the still. The methyl alcohol was condensed and recovered substantially ammonia-free. The ammonia was subsequently recovered and recycled. The crystalline calcium cyanide diammoniate was heated under a partial vacuum for 4 hours at a temperature of from 200 to 220° C., and the evolved ammonia recovered. The remaining product was a pale gray powder, analyzing 97.5% calcium cyanide.

Similarly, other alkaline earth metal cyanides may be prepared in substantially pure form utilizing either the alkaline earth metal oxides or hydroxides, it being highly important that in the recycling of the alcohol, the ammonia be removed.

When ethyl alcohol is used in place of methyl alcohol in the process, a larger quantity will be required due to the lower solubility of the alkaline earth metal cyanides therein.

The operation as described, affords a reliable and relatively inexpensive process for producing high grade alkaline earth metal cyanides.

While the invention has been described with particular reference to specific embodiments, it is to be understood that it is not to be limited thereto but is to be construed broadly and restricted solely by the scope of the appended claims.

We claim:

1. A method of producing an alkaline earth metal cyanide which includes the steps of forming an alcohol solution of an alkaline earth metal cyanide by adding HCN to a mixture of a compound chosen from the group consisting of the oxides and hydroxides of the alkaline earth metals and an alcohol chosen from the group consisting of methyl and ethyl alcohol adding $NH_3$ to the alcohol solution, separating the precipitated alkaline earth metal cyanide diammoniate from the mother liquor containing alcohol, ammonia and residual alkaline earth metal cyanide, deammoniating the alkaline earth metal cyanide diammoniate, separating a substantially ammonia-free alcohol from the mother liquor and returning the said alcohol to the cycle.

2. A method of producing an alkaline earth metal cyanide which includes the steps of forming an alcohol solution of an alkaline earth metal cyanide by adding HCN to a mixture of a compound chosen from the group consisting of the oxides and hydroxides of the alkaline earth metals and an alcohol chosen from the group consisting of methyl and ethyl alcohol adding $NH_3$ to the alcohol solution, separating the precipitated alkaline earth metal cyanide diammoniate from the mother liquor containing alcohol, ammonia and residual alkaline earth metal cyanide, deammoniating the alkaline earth metal cyanide diammoniate and returning the ammonia therefrom to the cycle, separating a substantially ammonia-free alcohol from the mother liquor and returning the said alcohol to the cycle.

3. A method of producing an alkaline earth metal cyanide which includes the steps of forming an alcohol solution of an alkaline earth metal cyanide by adding HCN to a mixture of a compound chosen from the group consisting of the oxides and hydroxides of the alkaline earth metals and an alcohol chosen from the group consisting of methyl and ethyl alcohol adding $NH_3$ to the alcohol solution, separating the precipitated alkaline earth metal cyanide diammoniate from the mother liquor containing alcohol, ammonia and residual alkaline earth metal cyanide, separating a substantially ammonia-free alcohol from the mother liquor and returning the said alcohol to the cycle, deammoniating the alkaline earth metal cyanide diammoniate, recovering the ammonia from the mother liquor and the deammoniation step and returning the same to the cycle.

4. A method of producing calcium cyanide which includes the steps of forming a methyl alcohol solution of calcium cyanide by adding HCN to a mixture of calcium hydroxide and methyl alcohol, adding $NH_3$ to the alcohol solution of calcium cyanide, filtering the precipitated calcium cyanide diammoniate from the mother liquor containing methyl alcohol, ammonia and residual calcium cyanide, adding aqueous sodium carbonate to the mother liquor and removing the precipitated calcium carbonate, distilling the methyl alcohol and ammonia from the thus treated mother liquor, recovering the aqueous sodium cyanide from the still residue, separately returning the methyl alcohol and ammonia to the cycle, heating the calcium cyanide diammoniate under partial vacuum at a temperature of from 200 to 220° C. and returning the evolved ammonia to the cycle.

LUDWIG J. CHRISTMANN.
ALFRED G. HOUPT.